Sept. 24, 1963      KOZO FUJII ET AL      3,105,065
           METHOD OF MANUFACTURING POLYVINY ALCOHOL
                    Filed April 22, 1959
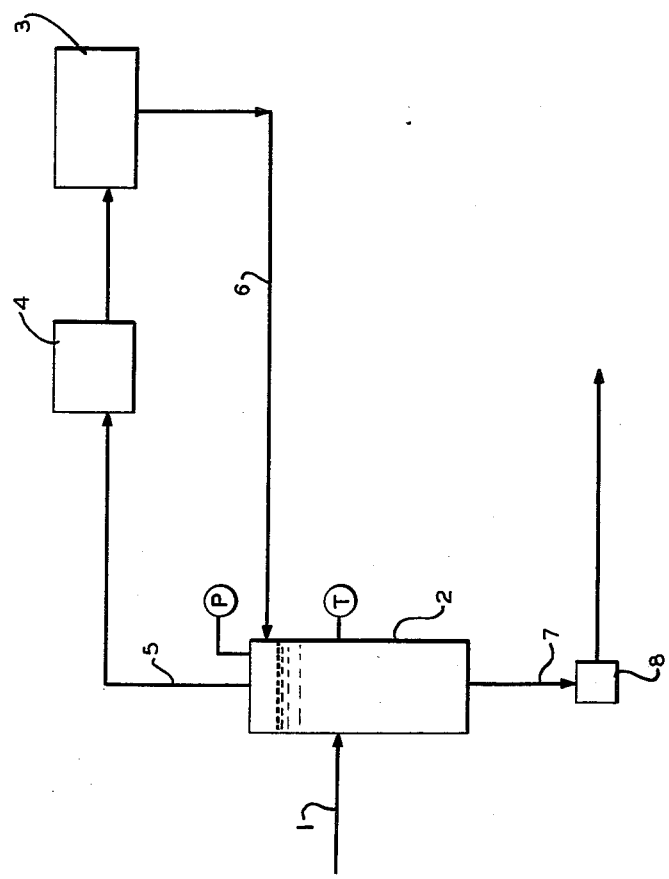
                              INVENTORS.
                              KOZO FUJII
                              HIROSHI IWASAKI
                              TAKAO SAITO
                              MASAKAZU MATSUMOTO
                           BY *William C. Long*
                               ATTORNEY

United States Patent Office 3,105,065
Patented Sept. 24, 1963

3,105,065
METHOD OF MANUFACTURING POLYVINYL ALCOHOL
Kozo Fujii, Toyonaka, Hiroshi Iwasaki, Nishinomiya, and Takao Saito and Masakazu Matsumoto, Kurashiki, Japan, assignors to Kurashiki Rayon Co., Ltd., Okayama, Japan, a corporation of Japan
Filed Apr. 22, 1959, Ser. No. 808,216
5 Claims. (Cl. 260—91.3)

This invention relates to the polymerization of vinyl esters to form polymeric vinyl esters from which linear polyvinyl alcohol having a narrow range of molecular weight can be obtained.

The polymerization of vinyl esters is exothermic. Heat must be removed from the reaction zone in order to prevent excessive temperatures. Normally, vinyl ester polymerizations are conducted at fairly high temperatures, e.g. 60° C. or more. However, at such high temperatures polymer is obtained which when converted to polyvinyl alcohol results in a product having a wide molecular weight distribution.

It is an object of the present invention to provide a method whereby vinyl esters can be polymerized at low temperatures to produce a product which can be converted into polyvinyl alcohol having a narrow range of molecular weight distribution.

Other objects will be apparent from the following description of the invention.

The relation between the conversion of vinyl ester monomer to polymer at different temperatures and the average degree of polymerization of polyvinyl alcohol formed therefrom is illustrated in the following table.

monomer and/or diluent under reduced pressure and removing the vapors from the reaction zone. In this way, the desired polymerization temperature is readily maintained. Practice of the invention results in the production of polymeric vinyl ester from which linear polyvinyl alcohol having a narrow molecular weight distribution can be prepared.

Referring now to the accompanying drawing, the vinyl ester monomer is introduced through line 1 into reaction zone 2. Preferably, the monomer is admixed with a diluent such as methyl alcohol or the like. For a desired degree of polymerization polyvinyl alcohol, greater amounts of diluent can be used in the low temperature polymerizations of this invention than in higher temperature polymerizations. The use of diluent also facilitates polymerization temperature control.

Also added to the reactor through line 1 is a polymerization catalyst having activity at temperatures under 50° C. Suitable catalysts include ortho chloro benzoyl peroxide, ortho alkoxy benzoyl peroxides, azo nitriles having the formula

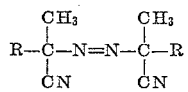

where R is an aliphatic hydrocarbon radical such as a methyl or tertiary butyl radical, and the like. Redox-type polymerization activators and initiators can be used. Light or ultra-violet radiation can also be employed to promote the polymerization.

Vacuum producing means 3 is provided as well as condenser 4. Through the use of the vacuum producing

| | | | | | | | |
|---|---|---|---|---|---|---|---|
| Monomer Conversion to Polymer @ 30° C., percent | 6.5 | 10.0 | 14.5 | 29.0 | 49.5 | | |
| Polyvinyl Alcohol Degree of Polymerization | 7,430 | 7,150 | 7,350 | 7,400 | 7,380 | | |
| Monomer Conversion to Polymer @ 40° C., percent | 6.0 | 12.0 | 18.5 | 27.5 | 38.5 | 52.5 | |
| Polyvinyl Alcohol Degree of Polymerization | 6,350 | 6,250 | 6,150 | 6,300 | 6,180 | 6,050 | |
| Monomer Conversion to Polymer @ 50° C., percent | 5.8 | 8.8 | 16.5 | 21.0 | 31.5 | 10.2 | 60.0 |
| Polyvinyl Alcohol Degree of Polymerization | 5,420 | 5,300 | 5,200 | 5,080 | 5,040 | 4,920 | 4,680 |
| Monomer Conversion to Polymer @ 60° C., percent | | 6.5 | 14.5 | 23.0 | 38.5 | 50.0 | 63.0 |
| Polyvinyl Alcohol Degree of Polymerization | | 4,170 | 4,060 | 3,950 | 3,770 | 3,500 | 3,320 |

These results show that at lower polymerization temperatures, e.g. about 40° C. or lower the degree of polymerization of polyvinyl alcohol obtained from the polymerized vinyl ester remains substantially constant regardless of the percentage conversion of vinyl ester monomer to polymer. Thus polyvinyl alcohol prepared from vinyl ester polymerized at such lower temperatures has a narrow molecular weight distribution. The use of elevated temperatures to polymerize vinyl esters results in an increased tendency for polymer branching to occur. At greater monomer to polymer conversions, the polymer branching will increase. However, at lower polymerization temperatures, the amount of branching is small even at higher conversions. The branching of polyvinyl alcohol is dependent upon the branching of the polymeric vinyl ester from which it is derived.

The accompanying drawing illustrates schematically an embodiment of the invention.

In accordance with the present invention vinyl ester monomer is polymerized at temperatures less than 50° C. The reaction temperature is maintained at the desired point by conducting the polymerization reaction in a reduced pressure zone. Heat of polymerization is removed from the reaction zone by vaporizing unreacted means, the pressure is reduced in reactor 2. The polymerization is conducted in the reactor under conditions such that the reaction mixture is constantly boiling at the reduced pressure. Evolved vapors are removed from the reactor through line 5 and are condensed in condenser 4. In the preferred continuous operation, the condensed liquid is recycled through line 6 to the reactor. Polymeric product is withdrawn from the reactor through line 7 and gear pump 8. The polymeric product can be further treated by known techniques to produce polyvinyl alcohol. Means are provided for measuring the reactor vacuum and temperature. The vacuum can be adjusted in accordance with the invention as needed to maintain the desired reaction temperature. In carrying out the invention it is necessary to maintain 500 mm. Hg vacuum at least in the reaction zone.

In an especially preferred embodiment of the invention, the ratio of the height of reactor 2 to the diameter of its base is less than 20. Under these conditions, satisfactory agitation of the polymerization mixture takes place wholly by the action of the boiling liquid. Where the ratio of the height of the reactor to the diameter of the base exceeds 20, it is necessary to employ agitating means in the reactor to insure uniform polymerization.

As the polymerization is carried out to higher degrees of conversion, the viscosity and boiling point of the reaction mixture increases gradually. Further, at high conversions, the degree of polymerization distribution becomes somewhat broader. It is preferred in carrying out the invention to conduct the polymerization such that 70% or less of the vinyl ester is polymerized. Where polyvinyl alcohol having a degree of polymerization of about 1600 is desired, large amounts of diluent can be employed and the monomer to polymer conversion carried to 90%. For 2500 degree of polymerization polyvinyl alcohol, 75% conversion can be employed. However, for product polyvinyl alcohol having very uniform degree of polymerization distribution, the conversion is maintained at 70% or less.

Vinyl acetate is the preferred vinyl ester monomer employed in the invention. However, other vinyl esters including vinyl formate, vinyl propionate, and the like can also be used.

Polyvinyl alcohol can be obtained from the polymerized vinyl ester by known techniques. Preferably the polymeric vinyl ester is saponified, i.e., subjected to alkaline catalyzed alcoholysis to produce polyvinyl alcohol. Other procedures can be used.

The following examples illustrate the invention:

Example 1

A mixture comprising by weight 900 parts of vinyl acetate, 100 parts of methanol, and 1.8 parts of 2,2'-azo-bis-(2,2'-dimethyl valeronitrile) was prepared. This mixture was charged to a reaction zone which was maintained at 320 mm. Hg vacuum ±10 mm. Hg. During the polymerization, vapors from the reaction zone were continuously condensed and returned to the reaction zone. The temperature of the reacting mixture was 40° C. ±0.5° C.

After 3 hours, about 36.3% of the vinyl acetate monomer had polymerized and the polymerization was discontinued. Degree of polymerization of the polyvinyl acetate averaged 5610. The polyvinyl acetate was saponified to polyvinyl alcohol which had an average degree of polymerization of 3915.

Example 2

A mixture comprising by weight 700 parts of vinyl acetate, 300 parts of methanol, and 7 parts of 2,2'-azo-bis-(2,2'-dimethyl valeronitrile) was polymerized similarly as described in Example 1. The polymerization zone was maintained under 210±10 mm. Hg vacuum. Polymerization temperature was 30±0.5° C. After 150 minutes, 22.0% of the vinyl acetate was polymerized. The polyvinyl acetate had an average degree of polymerization of 3622 and polyvinyl alcohol prepared therefrom had an average degree of polymerization of 2675.

Example 3

A mixture comprising by weight 850 parts of vinyl acetate, 150 parts of methanol, and 0.57 part of ortho oxy benzoyl peroxide were polymerized similarly as described in Example 1. The polymerization zone was maintained under 260 mm. Hg. Polymerization temperature was 35±0.5° C. After 12 hours, 42.3% of the vinyl acetate was polymerized. The polyvinyl acetate was saponified, and polyvinyl alcohol having an average degree of polymerization of 3110 was obtained.

Example 4

A mixture similar to that described in Example 3 was prepared except the mixture contained 1.7 parts benzoyl peroxide, 1.3 parts para-chloro-sulfonic acid and 0.1 part dimethyl aniline in place of the catalyst used above. This mixture was polymerized as described in Example 1. The polymerization zone was maintained under 320±10 mm. Hg vacuum. Polymerization temperature was 40±0.5° C. After 4 hours, about 64.1% of the vinyl acetate was polymerized. The polyvinyl acetate had an average degree of polymerization of 3175. Polyvinyl alcohol obtained therefrom by saponification had an average degree of polymerization of 2340.

Example 5

Vinyl acetate was continuously polymerized in a cylindrical reactor 3 meters high having a 60 cm. diameter base. Reactor volume was 850 liters. No reactor agitator was provided.

About 50 kg. per hour of vinyl acetate, 16.7 kg. per hour of methanol and 0.025 kg. per hour of 2,2'-azo-bis-(2,2-dimethyl valeronitrile) was introduced into the reactor. Temperature outside the reactor was maintained at 45° C. by indirect heat exchange. The reactor was maintained under 320±10 mm. Hg vacuum. Temperature of the polymerization system was 40±0.5° C. Vapors were continuously condensed and returned to the reactor.

Liquid was removed from the reactor continuously by a gear pump to maintain the volume of the reactants at 800 liters.

By this operation, 45±2% of the vinyl acetate was polymerized. The polyvinyl acetate had an average degree of polymerization of 2700±100. Polyvinyl alcohol obtained therefrom by saponification had an average degree of polymerization of 2300±100.

We claim:

1. A process for polymerizing vinyl acetate which comprises subjecting said vinyl acetate to polymerizing conditions in a homogeneous system at a temperature less than 50° C. and at a pressure less than 500 mm. Hg in the presence of a catalytic amount of a polymerization catalyst, said catalyst being a member selected from the group consisting of ortho chlorobenzoyl peroxides, ortho alkoxy benzoyl peroxides, azo nitriles, and redox catalysts comprising an activator and an initiator, and during the polymerization continuously removing the heat of polymerization by vaporization of at least one vaporizable component of the polymerization mixture, said vaporizable component being said vinyl acetate in the case of bulk polymerization and including an alcohol diluent in the case of solution polymerization in the presence of said alcohol diluent.

2. A continuous process for polymerizing vinyl acetate which comprises forming a solution of said vinyl acetate in methanol, said solution having incorporated therein a catalytic amount of a polymerization catalyst, said catalyst being a member selected from the group consisting of ortho chlorobenzoyl peroxides, ortho alkoxy benzoyl peroxides, azo nitriles, and redox catalysts comprising an activator and an initiator, continuously introducing said solution into a polymerization zone under polymerization conditions of a temperature less than 50° C. and at a pressure less than 500 mm. Hg, and during the polymerization of said vinyl acetate removing the heat of polymerization by continuously vaporizing material selected from the group consisting of said vinyl ester, said methanol, and mixtures thereof, condensing the vapors thus evolved, returning the condensate thus produced to the polymerization zone, and continuously removing polymerized vinyl ester from said polymerization zone.

3. A process for polymerizing vinyl acetate which comprises subjecting said vinyl acetate to polymerizing conditions in a homogeneous system at a temperature less than 50° C. and at a pressure less than 500 mm. Hg in the presence of a catalytic amount of a polymerization catalyst, said catalyst being a member selected from the group consisting of ortho chlorobenzoyl peroxides, ortho alkoxy benzoyl peroxides, azo nitriles, and redox catalysts comprising an activator and an initiator, and during the polymerization continuously removing the heat of polymerization by vaporization of at least one vaporizable component of the polymerization mixture, said vaporizable component being said vinyl acetate in the case of bulk polymerization and including an alcohol diluent in the case of solution polymerization in the presence of said alcohol diluent, the ratio of the height of said polymerization zone to its diameter at its base being less than 20 whereby the polymerizing mixture is agitated wholly by the boiling action thereof.

4. A continuous process for polymerizing vinyl acetate which comprises forming a solution of said vinyl acetate in methanol, said solution having incorporated therein a catalytic amount of a polymerization catalyst, said catalyst being a member selected from the group consisting of ortho chlorobenzoyl peroxides, ortho alkoxy benzoyl peroxides, azo nitriles, and redox catalysts comprising an activator and an initiator, continuously introducing said solution into a polymerization zone under polymerization conditions of a temperature less than 50° C. and at a pressure less than 500 mm. Hg, and during the polymerization of said vinyl acetate removing the heat of polymerization by continuously vaporizing material selected from the group consisting of said vinyl ester, said methanol, and mixtures thereof, condensing the vapors thus evolved, returning the condensate thus produced to the polymerization zone, and continuously removing polymerized vinyl ester from said polymerization zone, the ratio of the height of said polymerization zone to its diameter at its base being less than 20 whereby the polymerizing mixture is agitated wholly by the boiling action thereof.

5. The method of preparing linear polyvinyl alcohol having a narrow range of molecular weight distribution which comprises subjecting vinyl acetate in a homogeneous system containing an alcohol diluent to polymerizing conditions of a temperature less than 50° C. and at a pressure less than 500 mm. Hg in the presence of a catalytic amount of a polymerization catalyst, said catalyst being a member selected from the group consisting of ortho chlorobenzoyl peroxides, ortho alkoxy benzoyl peroxides, azo nitriles, and redox catalysts comprising an activator and an initiator, polymerizing said vinyl acetate to a degree of conversion of monomer to polymer not exceeding 70%, and during the polymerization continuously removing the heat of polymerization by vaporization of material from the polymerization mixture selected from the group consisting of said vinyl acetate, said diluent, and mixtures thereof, and saponifying the polymerized vinyl ester to form polyvinyl alcohol.

References Cited in the file of this patent

UNITED STATES PATENTS

| 1,897,856 | Noller | Feb. 14, 1933 |
| 2,383,069 | Marks | Aug. 21, 1945 |
| 2,570,056 | Halbig | Oct. 2, 1951 |
| 2,813,089 | Twaddle | Nov. 12, 1957 |

FOREIGN PATENTS

| 331,265 | Great Britain | June 23, 1930 |

OTHER REFERENCES

Powers: "Synthetic Resin and Rubber," page 121, Wiley (1943).

Melville: Plastics Progress, 1–10 (1955) (C.A.; 1956, 10441g).